United States Patent
Lauridsen

(10) Patent No.: US 9,841,135 B2
(45) Date of Patent: Dec. 12, 2017

(54) HEATABLE PACKER

(71) Applicant: NAL PRODUCTS APS, Varde (DK)

(72) Inventor: Niels Arne Lauridsen, Varde (DK)

(73) Assignee: NAL Products APS, Varde (DK)

( * ) Notice: Subject to any disclaimer, the term of this patent is extended or adjusted under 35 U.S.C. 154(b) by 0 days.

(21) Appl. No.: 14/894,286

(22) PCT Filed: May 28, 2014

(86) PCT No.: PCT/DK2014/050147
§ 371 (c)(1),
(2) Date: Nov. 25, 2015

(87) PCT Pub. No.: WO2014/190999
PCT Pub. Date: Dec. 4, 2014

(65) Prior Publication Data
US 2016/0116099 A1    Apr. 28, 2016

(30) Foreign Application Priority Data

May 29, 2013 (DK) ................................ 2013 70294

(51) Int. Cl.
F16L 55/16 (2006.01)
F16L 55/44 (2006.01)
F16L 55/163 (2006.01)

(52) U.S. Cl.
CPC ............ F16L 55/44 (2013.01); F16L 55/163 (2013.01)

(58) Field of Classification Search
CPC  F16L 55/1652; F16L 55/1653; F16L 55/1654
USPC ............... 138/98, 97; 156/287; 264/269, 36; 405/150.1
See application file for complete search history.

(56) References Cited

U.S. PATENT DOCUMENTS

| 4,671,840 A | | 6/1987 | Renaud | |
|---|---|---|---|---|
| 5,010,440 A | * | 4/1991 | Endo | B29C 53/382 |
| | | | | 138/97 |
| 5,044,824 A | * | 9/1991 | Long, Jr. | E03F 3/06 |
| | | | | 156/287 |
| 5,071,506 A | | 12/1991 | Nelson et al. | |
| 5,322,653 A | * | 6/1994 | Muller | B29C 63/28 |
| | | | | 138/97 |

(Continued)

FOREIGN PATENT DOCUMENTS

| DE | 202005018790 U1 | 6/2006 |
|---|---|---|
| DE | 202011005335 U1 | 10/2011 |
| WO | 93/19321 | 9/1993 |

OTHER PUBLICATIONS

International Bureau, International Preliminary Report on Patentability Chapter I, PCT/DK2014/050147, dated Dec. 1, 2015.

(Continued)

*Primary Examiner* — Patrick F Brinson
(74) *Attorney, Agent, or Firm* — Ice Miller LLP

(57) ABSTRACT

Packer for use when repairing underground pipe systems, where said packer comprises a flexible and/or expandable main body portion surrounding a hollow interior, said body portion having an elongated shape defining first and second ends in either end of the main body portion, and where heating means are arranged in the packer for heating the packer or at least the surface of the packer, and means are provided for pressurizing the interior of the packer thereby expanding the packer.

20 Claims, 3 Drawing Sheets

(56) References Cited

U.S. PATENT DOCUMENTS

| | | | |
|---|---|---|---|
| 5,451,351 A * | 9/1995 | Blackmore | B29C 63/0069 138/97 |
| 5,606,997 A * | 3/1997 | Blackmore | B29C 63/0069 138/97 |
| 5,727,597 A | 3/1998 | Fisco | |
| 6,626,447 B2 * | 9/2003 | Nelson | F16L 55/28 138/98 |
| 6,755,592 B2 * | 6/2004 | Janssen | F16L 55/1645 138/97 |
| 6,868,870 B2 * | 3/2005 | Warren | F16L 55/1654 138/97 |
| 7,052,567 B1 | 5/2006 | Blackmore et al. | |
| 7,073,536 B2 * | 7/2006 | Blackmore | B29C 63/0069 138/97 |
| 7,514,653 B2 * | 4/2009 | Lepola | F16L 47/03 156/156 |
| 7,523,764 B2 * | 4/2009 | Lepola | F16L 55/1654 138/97 |
| 9,052,054 B2 * | 6/2015 | Nobileau | E21B 43/103 |
| 2006/0130923 A1 | 6/2006 | Lepola et al. | |
| 2007/0272679 A1 | 11/2007 | Lepola et al. | |
| 2010/0043903 A1 * | 2/2010 | Muhlin | F16L 55/179 138/98 |

OTHER PUBLICATIONS

International Searching Authority, Written Opinion of the International Searching Authority, dated Nov. 29, 2015.
PCT/DK2014/050147, European Patent Office, International Search Report, dated Aug. 12, 2014.
PA201370294, Danish Patent and Trademark Office, Search Report-Patent, dated Jan. 6, 2014.

* cited by examiner

HEATABLE PACKER

CROSS-REFERENCE TO RELATED APPLICATIONS

The present application is a U.S. national stage of, and claims the priority benefit of, International Patent Application Serial No. PCT/DK2014/050147, filed May 28, 2014 and Danish Patent Application Serial No. PA2013 70294, filed May 29, 2013, the text and drawings of which are hereby incorporated by reference in their entireties.

FIELD OF THE INVENTION

The present invention is directed to a heatable packer as well as a method of using such a packer for repairing underground pipes.

BACKGROUND OF THE INVENTION

In the art a number of no-dig methods for repairing underground pipes are used. Common for most of these methods and devices used in the methods is the fact that they seek out the point of the pipe where breakage or damage has occurred and with various means removes any debris resulting from the damage. At this point a number of different methods find use, for example in one method a very long and thin "stocking" is introduced into the pipe section which stocking afterwards is inflated and a hardenable mass, for example an epoxy is applied to the inside of the stocking thereby creating a new interior pipe inside the existing pipe in a relining process.

Other systems include the use of a packer where a suitable packer is selected depending on the size of the pipe, the distance to the damage, the extent of the damage etc. Before the packer is positioned in the damaged area, repair materials, typically in the shape of a reinforcement mat, for example a glass or carbon fibre mat impregnated with a hardenable mass, for example cement-based or epoxy-based, is arranged on the outside of the packer. These preparations (repair materials etc) are carried out outside the pipe in order for personnel to be able to carry out the process. Typically the works will be handled in a manhole or above ground. After having mixed the hardenable mass and positioned the mat correctly on the packer the packer is transported, i.e. pulled, pushed or otherwise moved along inside the pipe until it reaches the position where the repair patch/repair materials are to be applied to the damage in the underground pipe.

Once the packer reaches its desired position the packer is inflated whereby the repair materials are urged against the sidewall of the pipe. At this time the packer is left in place in order to allow the hardenable cement-based or epoxy-based mass to harden and adhere to the inside of the pipe. This process typically takes a few hours after which the packer is deflated and removed again leaving the repair patch/repair material in place, hopefully having repaired the damage to the pipe system.

These methods are all well-known in the art, but do have substantial disadvantages and drawbacks which the present invention addresses, particularly relating to the method implementing a packer.

The repair materials typically comprise some type of flexible mat, for example made from glass fibres or carbon fibres, which mat is suitable to be embedded in or impregnated with a hardenable mass, typically cement-based or epoxy-based. When working with hardenable masses there is typically a set period of time available (opening time) in order to mix and apply the material after which a certain period (setting time) is required before the material has reached its desired strength or the necessary strength in order to remove the scaffolding, in this case the packer. Normally, the fast reaction time (setting time) and thereby the less time consuming process also only leaves the minimum time available for applying the material to the packer (opening time), position the packer in the correct position relative to the damage to the pipe and inflating the packer in the desired position for the required setting time. It would be desirable to have a longer working time, i.e. more time to prepare the mixture and the repair patch on the packer and more time to guide and introduce the packer into the correct position in the damaged pipe system and time to inflate and ensure that the packer is in the correct position before the open time of the material has run out, i.e. before it sets such that it becomes impossible to work. Therefore a longer opening time is desirable and at the same time a shorter setting time is desirable, in that once the packer is inflated and urging the repair materials into the damaged part of the pipe, this time can only be used for putting things away, cleaning and waiting.

For typical products used for these processes the opening time can be selected for example as material having an opening time of 50 minutes which in turn requires four hours curing time or half an hour opening time requiring three hours hardening time, 15 minutes opening time requiring one and a half hour curing time and finally a very fast material only having an opening time of 8 minutes and requiring only half an hour curing time.

The opening time is used for mixing the materials which are typically two-component materials, i.e. a base material and a hardener, which needs to be mixed thoroughly in order to ensure a satisfying result, placing the repair materials on the flexible packer, introducing the packer into the correct position inside the pipe system and inflating the packer to a desired pressure in order to apply the repair materials in the correct position. Depending on how far the damaged area is from the nearest manhole, it is very often very difficult to use materials having a very fast reaction or short opening time. One factor which is advantageous to this part of the job is the fact that typically in a sewer the temperature will be 6-8° C. relatively constant around the year whereas the reaction times/opening times mentioned above are calculated at 20° C. The lower temperature will naturally slow down the chemical reactions and thereby increase the opening times allowing the workers more time to mix, place and position the repair materials in the correct position. It is, however, not significantly more time that may be obtained in this manner. On the other hand, the low temperature also provides a serious set-back for the process in that the setting time/curing time of the materials will also be substantially longer. The curing time is for personnel reasons to be considered mainly as wasted time, both with respect to the personnel waiting around for the patch to cure, but also for the investment in machinery and equipment which is used during the process. These factors naturally make the entire process overly costly in comparison with the work which is in fact achieved.

Object of the Invention

Consequently it is the object of the present invention to improve this method.

DESCRIPTION OF THE INVENTION

The present invention addresses this by providing a packer for use when repairing underground pipe systems, where said packer comprises a flexible and/or expandable main body portion surrounding a hollow interior, said body portion having an elongated shape defining first and second ends in either end of the main body portion, and where heating means are arranged in the packer for heating the packer or at least the surface of the packer, and means are provided for pressurizing the interior of the packer thereby expanding the packer.

Especially the provision of a heating means inside the packer which heating means can be activated from a remote position makes it possible to shorten the waiting/waste time associated with personnel waiting for the repair material to achieve the specified curing, i.e. gaining the necessary curing time, for example up to three hours for some materials. Tests with the system incorporating a heating means inside the packer have indicated that the waiting time can easily be halved, and as such the provision of heating means efficiently shortens the waiting time and thereby improves the overall method.

In this way it becomes possible to use the products which have a longer opening time and by activating the heating means shorten the curing time thereby achieving the best of both, i.e. the longest available time in order to prepare the packer in its correct position and the shortest possible curing time before being able to remove and retract the packer.

In a further advantageous embodiment of the invention means for heating the packer is in the shape of one or more heatable wire(s) arranged inside the interior of the packer. Naturally depending on the size of the packer one or more heatable wires may be arranged inside the packer and the electrical connection or connections to the energy source providing the heat may be a common manifold or outlet arranged in one end of the packer.

In a still further advantageous embodiment of the invention one or more flexible bulkheads are provided inside the hollow interior, each bulkhead arranged substantially crosswise relative to the elongated shape of the body portion, where each bulkhead is provided with a number of apertures, allowing the heatable wire(s) to pass through the bulkhead.

It is necessary that the bulkheads are flexible as they will need to be deformable together with the packer as the packer is expanded as already mentioned above when it reaches the desired position inside the pipe. The apertures provided in the bulkheads allow the heating means, for example in the shape of heatable wires, to pass through the entire length of the packer and at the same time guide them to an arrangement such that in applications where a number heatable wires are positioned inside the packer the bulkheads will ensure that they are evenly distributed inside the interior and do not accumulate at the bottom of the packer due to the influence of gravity.

In a still further advantageous embodiment of the invention the means for heating the packer is in the shape of filaments embedded in the material of the main body portion, alternatively the filaments are loosely arranged in envelopes, said envelopes being embedded in the material, such that as the packer expands the envelopes will deform, without deforming the filaments, or where at least part of the material from which the body portion is made is electrically heatable.

In this alternative embodiment the heating means is integrated into the packer as such and will therefore be much closer to the surface where the heat is desired in order to cure the repair materials. Due to the expansion of the packer once it is in position, the filaments may be very fragile and easy to damage. In order to address this the heating filaments may be provided in envelopes such that the envelopes will deform without touching the filaments as such.

In a still further advantageous embodiment of the invention the first first and/or second ends comprises plugs fastened to the main body portion, where the plug in the first end is provided with means for connecting the interior of the packer to a source of pressurized medium and a source of electrical energy. Although the packer may be in the shape of a balloon, i.e. a continuous, flexible, spherical body, it is advantageous to have a packer which is in the shape of a cylindrical tube section and provided with plugs in either end. The plugs are fastened to the main body portion, for example by a sealant or welding when possible or any other means which renders the packer as such substantially air tight such that it is possible to achieve a desired pressure in order to expand the packer inside the main body portion. Consequently, the term "airtight" shall in this context therefore be understood as sufficiently tight in order to be able to generate enough pressure inside the packer such that sufficient expansion and pressure will be generated in order to fulfil its purpose of forcing/urging the repair material into close and solid contact with the damaged area of the pipe system. Furthermore, a plug may be provided with connection means both for connecting to a source of pressurized medium, but also to a source of electrical energy in the case where the heating means are electrical wires. The plugs may be made relatively rigid such that it is easier to control and handle the connection means.

In a still further advantageous embodiment of the invention the pressurized medium is air or oil or water.

Although the preferred material is to use pressurized air as this is readily available and may easily be discarded inside any sewer system, it is also advantageous in some embodiments of the invention to use an oil-based fluid or water as these have a higher heat conductivity than air as such. In these applications it is typical to have a reservoir of oil or water provided at the other end of the connection to the packer such that when it is desirable to retract the packer from the position where it has carried out its repair procedure, the medium, be it oil or water, is sucked out and pumped back into the reservoir for further or repeated use.

As the heating means are arranged inside the packer there is no heat loss through the pipe system which could otherwise be the case should the medium be heated in the reservoir before being introduced into the packer. This also further improves the efficiency of the invention.

In a still further advantageous embodiment of the invention the main body portion is substantially cylindrical and made from a polymer material or a modified and/or reinforced rubber material and where said material is only expandable in a radial direction relative to the longitudinal axis of the cylinder.

By providing expansion only in the radial direction it is achieved that as the packer and the repair material comes into contact with the inside wall of the pipe the packer will only urge the repair material into contact with the side of the wall in or from a direction perpendicular to the wall (i.e. in the radial direction) and not due to undesired longitudinal expansion also force the material in a direction parallel to the side of the wall. In this manner it is achieved that no separation or segregation (stretching) of the materials occurs.

In a still further advantageous embodiment of the invention the heating means is controlled to a surface temperature range between 15 to 105° C., more preferred 25 to 85° C. and most preferred 50-60° C. At these temperatures the materials do not experience temperature deformations and at the same time the temperature is sufficiently elevated in order to achieve the shorter curing times which in turn allow for a more rapid overall installation process.

In a further embodiment the packer is provided with one or more wheels arranged on the outside of the packer. This is especially advantageous for large pipe diameters where the packer needs to be transported a substantial distance into the pipe system before application of the repair process. Due to the wheels the friction between the bottom of the pipe and the packer is greatly reduced, and it becomes easier and less of a task to arrange the packer in its correct position.

The invention is also directed at a method of repairing an underground pipe using a packer as described above, where the method comprises the following steps:
  a. Localizing the damaged pipe, the size of the breakage and the diameter of the pipe
  b. Selecting a packer according to any of claims 1 to 9, said packer having a size smaller than the diameter of the pipe when not inflated and a diameter larger than the damaged pipe when inflated;
  c. Connecting the selected packer to a source of pressurized medium—typically air, and a source of electric energy;
  d. Applying repair materials to the outside of the packer in sufficient amounts to cover and repair the breakage;
  e. Guide and position the packer with the repair materials into the site of the damage/breakage;
  f. Introduce pressurized medium into the packer, thereby expanding the packer, such that the repair materials comes into contact with the site of repair;
  g. Either simultaneously or after pressurized medium is introduced into the packer, the heatable wires are activated, increasing the temperature of the packer to a desired temperature selected between 15 and 105° C.;
  h. Maintaining pressure and temperature in the packer during the specified curing time for the particular repair materials used;
  i. Turning off the heating means, deflating the packer and withdrawing the packer from the site.

DESCRIPTION OF THE DRAWING

The invention will now be described with reference to the accompanying drawings in which.

DETAILED DESCRIPTION OF THE INVENTION

Figure 1:
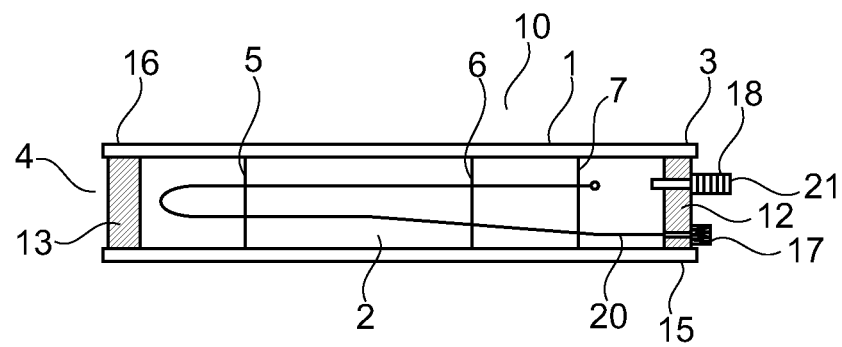
FIG. 1 illustrates a schematic cross-section through a packer.

In FIG. 1 is illustrated a schematic cross-section through a packer 10 according to the invention. The packer 10 comprises a flexible and/or expandable main body portion 1 surrounding a hollow interior portion 2. The body portion 1 has an elongated shape defining first and second ends 3, 4. Heating means 20 are arranged inside the packer for heating the packer. Furthermore, means 21 are provided for attaching a source of pressurized medium to the packer thereby providing the possibility of expanding the flexible and/or expandable main body portion 1 of the packer 10. In the illustrated embodiment the packer 10 is provided with three flexible bulkheads 5, 6, 7. Each bulkhead 5, 6, 7 is provided with apertures (not illustrated) in order to maintain the heating element 20 in a substantially fixed position inside the packer. In the first and second ends 3, 4 of the packer 10 is provided plugs 12, 13. The plugs are in this embodiment adhered to the inside of the main body portion 1 by a suitable adhesive or a weld and furthermore fastened with a tie clamp 15, 16.

The plug 12 in the first end 3 is provided with connection means 17 connecting the electrical heating element to a source of electrical energy. Furthermore a connector 18 is provided in this instance for connecting the interior 2 of the packer 10 with a source of pressurized air. In other embodiments it is foreseen that the hollow interior may be connected to a source of water or oil in order to expand the main body portion 1.

Figure 2:
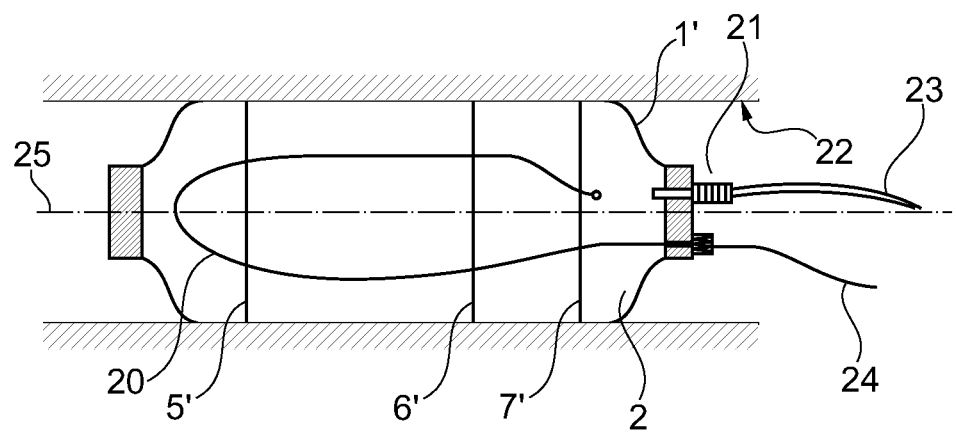
FIG. 2 illustrates the same packer in an inflated mode.

In FIG. 2 is illustrated the same packer in an inflated mode where the main body portion 1' due to pressure inside the hollow interior 2 has expanded such that the main body portion 1' is in contact with the interior wall 22 of a sewage pipe. The bulkheads 5', 6', 7' have expanded correspondingly such that the electrical heating member 20 maintains its original position inside the hollow interior 2. In this embodiment it is foreseen that the main body portion 1' is designed such that it may only expand radially, i.e. radially from the axis 25 of the sewage pipe. In this manner any movement of the repair patch in the axial direction is avoided thereby ensuring that the patch is not stretched or damaged due to the longitudinal extension of the packer caused by the elevated pressure/expansion of the hollow interior.

The inlet for pressurized media 21 is connected to a flexible pipe 23 which in the other end (not illustrated) is connected to means for generating an elevated air pressure sufficient to expand the packer 10 inside the sewage pipe. In the same manner the electrical heating element 20 is provided with electrical connection means 24 connecting the heating element 20 to a source of electrical energy.

Figure 3:
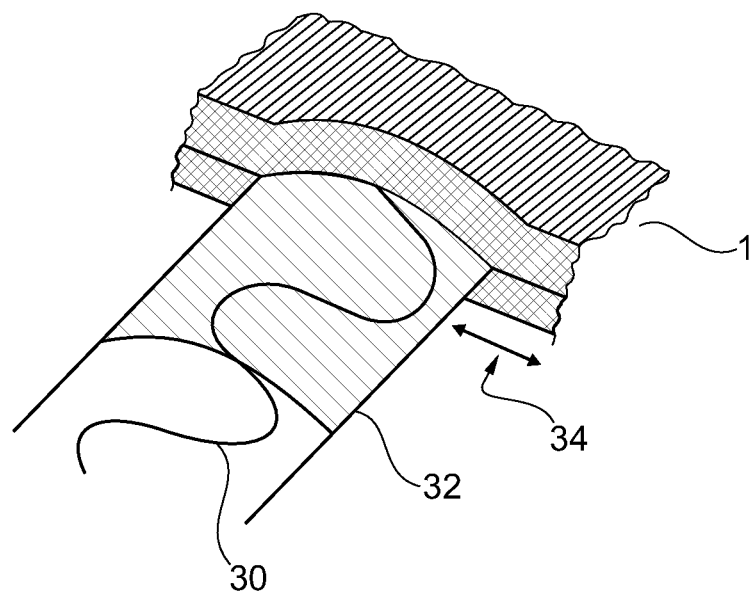
FIG. 3 illustrates schematically an embedded heating filament.

Turning to FIG. 3 a schematic illustration of an embedded heating filament 30 is illustrated. The heating filament 30 is placed in an envelope 32 which envelope is integrated into the material from which the main body portion 1 is manufactured. In the illustration only a very small section of the main body portion 1 is schematically illustrated. It is foreseen that electrical filaments and envelopes 30, 32 may be arranged at suitable intervals parallel to the longitudinal axis of the main body portion in order to be able to heat the packer and more specifically heat the surface of the packer in order to speed up the curing process.

As the main body portion 1 is expanded as illustrated with reference to FIG. 2 from a state as illustrated in FIG. 1, the material from which the main body portion 1 is manufactured will be exposed to pulling forces in a peripheral direction as illustrated by the arrow 34. The peripheral direction is to be understood as the direction orthogonal to a radial in that as the diameter of the packer 10 expands, the material of the main body portion 1 will be drawn out and be thinner in fact creating forces indicated by the arrow 34. As the envelopes are integrated in the material and the heating filaments 30 are loosely arranged inside the envelopes, only the envelopes will be influenced by the expansion of the main body portion 1 and as such the filaments will be unharmed. In this manner it is possible to provide heating very close to the surface of the packer and thereby create a more homogenous and faster heating capability for example achieved with the embodiments described above.

Figure 4:
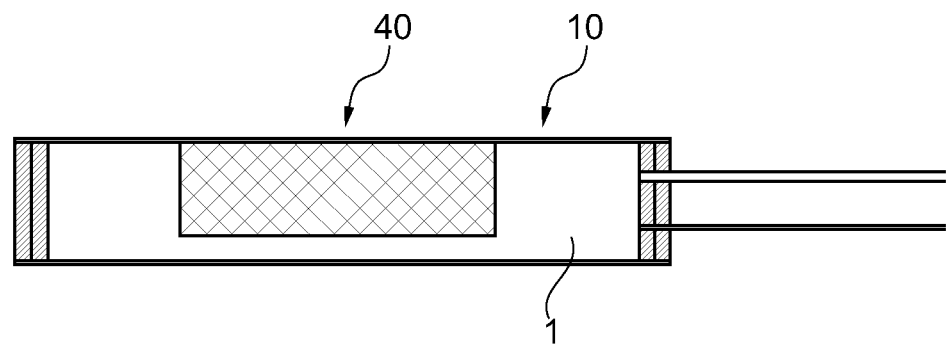
FIG. 4 illustrates a packer 10 which is ready to be inserted into a sewage pipe for carrying out a repair procedure

In FIG. 4 is illustrated a packer 10 which is ready to be inserted into a sewage pipe for carrying out a repair procedure. The packer 10 is on the exterior surface of the main body portion 1 provided with packaging material 40 in the shape of in this embodiment a glass-fibre mat impregnated with an epoxy compound. The extent of the patch 40 is such that once the packer 10 is positioned correctly in the sewage pipe, i.e. superposed the damaged part of the pipe, expansion of the packer as illustrated with reference to FIG. 2 will cause the repair patch 40 to substantially cover the damaged area and an undamaged section around the damage. The heating means, be it filaments as described above with reference to FIG. 3 or a heating element as illustrated in FIGS. 1 and 2, will then be activated in order to elevate the temperature. Inside sewer pipes the temperature will typically be 6-8° C. all year round, and in order to speed up the setting process of the epoxy compound the temperature will typically be increased to around 50-60° C. The temperature itself will have no detrimental effect on the material characteristics of the epoxy, but will speed up the setting process and as such shorten the time needed before the repair patch has reached sufficient strength such that the packer 10 may be deflated and removed from the site.

Figure 5:
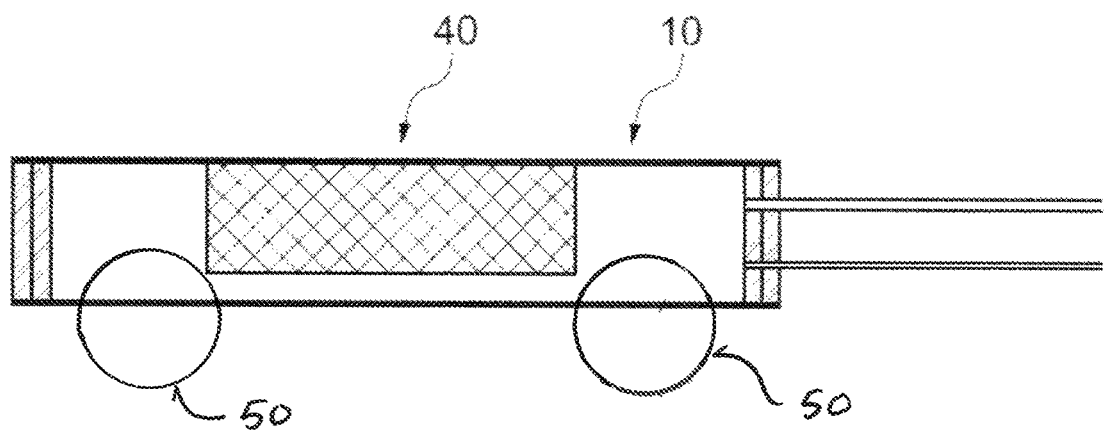
FIG. 5 illustrates a packer with wheels

In FIG. 5 is illustrated a packer 10 similar to the packer 10 described above with reference to FIG. 4, only in this embodiment the packer 10 is further provided with wheels 50.

Having described the invention with reference to specific embodiments it is to be understood that modifications and changes of the specific embodiments are contemplated within the scope of the appended claims.

The invention claimed is:

1. Packer for use when repairing underground pipe systems, where said packer comprises a flexible and/or expandable main body portion surrounding a hollow interior, said body portion having an elongated shape defining first and second ends in either end of the main body portion and having one or more flexible bulkheads inside the hollow interior, and where each bulkhead is arranged substantially cross-wise relative to the elongated shape of the body portion, and where heating means are arranged in the packer for heating the packer or at least the surface of the packer, wherein the means for heating the packer is in the shape of one or more heatable wire(s) arranged inside the interior of the packer, and means are provided for pressurizing the interior of the packer thereby expanding the packer.

2. The Packer according to claim 1, wherein each bulkhead is arranged substantially cross-wise relative to the elongated shape of the body portion, where each bulkhead is provided with a number of apertures, allowing the heatable wire(s) to pass through the bulkhead.

3. The Packer according to claim 1 wherein the means for heating the packer is in the shape of filaments embedded in the material of the main body portion, alternatively the filaments are loosely arranged in envelopes, said envelopes being embedded in the material, such that as the packer expands the envelopes will deform, without deforming the filaments, or where at least part of the material from which the body portion is made is electrically heatable.

4. The Packer according to claim 1 wherein the first and/or second ends comprises plugs fastened to the main body portion, where the plug in the first end is provided with means for connecting the interior of the packer to a source of pressurized medium and a source of electrical energy.

5. The Packer according to claim 4 wherein the pressurized medium is air or oil or water.

6. The Packer according to claim 1, wherein the main body portion is substantially cylindrical and made from a polymer material or a modified and/or reinforced rubber material and where said material is only expandable in a radial direction relative to the longitudinal axis of the cylinder.

7. The Packer according to claim 1 wherein the heating means is controlled to a surface temperature of the packer in a range between 15 to 105° C.

8. The Packer according to claim 1 wherein the packer is provided with one or more wheels arranged on the outside of the packer.

9. The Packer according to claim 1 wherein the heating means is controlled to a surface temperature of the packer in a range between 25 to 85° C.

10. The Packer according to claim 1 wherein the heating means is controlled to a surface temperature of the packer in a range between 50-60° C.

11. Method of repairing an underground pipe using a packer according claim 1 comprising the following steps:
  a. Localizing the damaged pipe, the size of the breakage and the diameter of the pipe
  b. Selecting a packer according to claim 1, said packer having a size smaller than the diameter of the pipe when not inflated and a diameter larger than the damaged pipe when inflated;
  c. Connecting the selected packer to a source of pressurized medium—typically air, and a source of electric energy;
  d. Applying repair materials to the outside of the packer in sufficient amounts to cover and repair the breakage;
  e. Guide and position the packer with the repair materials into the site of the damage/breakage;
  f. Introduce pressurized medium into the packer, thereby expanding the packer, such that the repair materials comes into contact with the site of repair;
  g. Either simultaneously or after pressurized medium is introduced into the packer, the heating means are activated, increasing the temperature of the packer to a desired temperature selected between 15 and 105° C.;
  h. Maintaining pressure and temperature in the packer during the specified curing time for the particular repair materials used;
  i. Turning off the heating means, deflating the packer and withdrawing the packer from the site.

12. Method of repairing an underground pipe using a packer according claim 2 comprising the following steps:
  a. Localizing the damaged pipe, the size of the breakage and the diameter of the pipe
  b. Selecting a packer according to claim 2, said packer having a size smaller than the diameter of the pipe when not inflated and a diameter larger than the damaged pipe when inflated;
  c. Connecting the selected packer to a source of pressurized medium—typically air, and a source of electric energy;
  d. Applying repair materials to the outside of the packer in sufficient amounts to cover and repair the breakage;
  e. Guide and position the packer with the repair materials into the site of the damage/breakage;
  f. Introduce pressurized medium into the packer, thereby expanding the packer, such that the repair materials comes into contact with the site of repair;
  g. Either simultaneously or after pressurized medium is introduced into the packer, the heating means are activated, increasing the temperature of the packer to a desired temperature selected between 15 and 105° C.;
  h. Maintaining pressure and temperature in the packer during the specified curing time for the particular repair materials used;

i. Turning off the heating means, deflating the packer and withdrawing the packer from the site.

13. Method of repairing an underground pipe using a packer according claim 3 comprising the following steps:
   a. Localizing the damaged pipe, the size of the breakage and the diameter of the pipe
   b. Selecting a packer according to claim 3, said packer having a size smaller than the diameter of the pipe when not inflated and a diameter larger than the damaged pipe when inflated;
   c. Connecting the selected packer to a source of pressurized medium—typically air, and a source of electric energy;
   d. Applying repair materials to the outside of the packer in sufficient amounts to cover and repair the breakage;
   e. Guide and position the packer with the repair materials into the site of the damage/breakage;
   f. Introduce pressurized medium into the packer, thereby expanding the packer, such that the repair materials comes into contact with the site of repair;
   g. Either simultaneously or after pressurized medium is introduced into the packer, the heating means are activated, increasing the temperature of the packer to a desired temperature selected between 15 and 105° C.;
   h. Maintaining pressure and temperature in the packer during the specified curing time for the particular repair materials used;
   i. Turning off the heating means, deflating the packer and withdrawing the packer from the site.

14. Method of repairing an underground pipe using a packer according claim 4 comprising the following steps:
   a. Localizing the damaged pipe, the size of the breakage and the diameter of the pipe
   b. Selecting a packer according to claim 4, said packer having a size smaller than the diameter of the pipe when not inflated and a diameter larger than the damaged pipe when inflated;
   c. Connecting the selected packer to a source of pressurized medium—typically air, and a source of electric energy;
   d. Applying repair materials to the outside of the packer in sufficient amounts to cover and repair the breakage;
   e. Guide and position the packer with the repair materials into the site of the damage/breakage;
   f. Introduce pressurized medium into the packer, thereby expanding the packer, such that the repair materials comes into contact with the site of repair;
   g. Either simultaneously or after pressurized medium is introduced into the packer, the heating means are activated, increasing the temperature of the packer to a desired temperature selected between 15 and 105° C.;
   h. Maintaining pressure and temperature in the packer during the specified curing time for the particular repair materials used;
   i. Turning off the heating means, deflating the packer and withdrawing the packer from the site.

15. Method of repairing an underground pipe using a packer according claim 5 comprising the following steps:
   a. Localizing the damaged pipe, the size of the breakage and the diameter of the pipe
   b. Selecting a packer according to claim 5, said packer having a size smaller than the diameter of the pipe when not inflated and a diameter larger than the damaged pipe when inflated;
   c. Connecting the selected packer to a source of pressurized medium—typically air, and a source of electric energy;
   d. Applying repair materials to the outside of the packer in sufficient amounts to cover and repair the breakage;
   e. Guide and position the packer with the repair materials into the site of the damage/breakage;
   f. Introduce pressurized medium into the packer, thereby expanding the packer, such that the repair materials comes into contact with the site of repair;
   g. Either simultaneously or after pressurized medium is introduced into the packer, the heating means are activated, increasing the temperature of the packer to a desired temperature selected between 15 and 105° C.;
   h. Maintaining pressure and temperature in the packer during the specified curing time for the particular repair materials used;
   i. Turning off the heating means, deflating the packer and withdrawing the packer from the site.

16. Method of repairing an underground pipe using a packer according claim 6 comprising the following steps:
   a. Localizing the damaged pipe, the size of the breakage and the diameter of the pipe
   b. Selecting a packer according to claim 6, said packer having a size smaller than the diameter of the pipe when not inflated and a diameter larger than the damaged pipe when inflated;
   c. Connecting the selected packer to a source of pressurized medium—typically air, and a source of electric energy;
   d. Applying repair materials to the outside of the packer in sufficient amounts to cover and repair the breakage;
   e. Guide and position the packer with the repair materials into the site of the damage/breakage;
   f. Introduce pressurized medium into the packer, thereby expanding the packer, such that the repair materials comes into contact with the site of repair;
   g. Either simultaneously or after pressurized medium is introduced into the packer, the heating means are activated, increasing the temperature of the packer to a desired temperature selected between 15 and 105° C.;
   h. Maintaining pressure and temperature in the packer during the specified curing time for the particular repair materials used;
   i. Turning off the heating means, deflating the packer and withdrawing the packer from the site.

17. Method of repairing an underground pipe using a packer according claim 7 comprising the following steps:
   a. Localizing the damaged pipe, the size of the breakage and the diameter of the pipe
   b. Selecting a packer according to claim 7, said packer having a size smaller than the diameter of the pipe when not inflated and a diameter larger than the damaged pipe when inflated;
   c. Connecting the selected packer to a source of pressurized medium—typically air, and a source of electric energy;
   d. Applying repair materials to the outside of the packer in sufficient amounts to cover and repair the breakage;
   e. Guide and position the packer with the repair materials into the site of the damage/breakage;
   f. Introduce pressurized medium into the packer, thereby expanding the packer, such that the repair materials comes into contact with the site of repair;
   g. Either simultaneously or after pressurized medium is introduced into the packer, the heating means are activated, increasing the temperature of the packer to a desired temperature selected between 15 and 105° C.;

h. Maintaining pressure and temperature in the packer during the specified curing time for the particular repair materials used;
i. Turning off the heating means, deflating the packer and withdrawing the packer from the site.

18. Method of repairing an underground pipe using a packer according claim 8 comprising the following steps:
    a. Localizing the damaged pipe, the size of the breakage and the diameter of the pipe
    b. Selecting a packer according to claim 8, said packer having a size smaller than the diameter of the pipe when not inflated and a diameter larger than the damaged pipe when inflated;
    c. Connecting the selected packer to a source of pressurized medium—typically air, and a source of electric energy;
    d. Applying repair materials to the outside of the packer in sufficient amounts to cover and repair the breakage;
    e. Guide and position the packer with the repair materials into the site of the damage/breakage;
    f. Introduce pressurized medium into the packer, thereby expanding the packer, such that the repair materials comes into contact with the site of repair;
    g. Either simultaneously or after pressurized medium is introduced into the packer, the heating means are activated, increasing the temperature of the packer to a desired temperature selected between 15 and 105° C.;
    h. Maintaining pressure and temperature in the packer during the specified curing time for the particular repair materials used;
    i. Turning off the heating means, deflating the packer and withdrawing the packer from the site.

19. Method of repairing an underground pipe using a packer according claim 9 comprising the following steps:
    a. Localizing the damaged pipe, the size of the breakage and the diameter of the pipe
    b. Selecting a packer according to claim 9, said packer having a size smaller than the diameter of the pipe when not inflated and a diameter larger than the damaged pipe when inflated;
    c. Connecting the selected packer to a source of pressurized medium—typically air, and a source of electric energy;
    d. Applying repair materials to the outside of the packer in sufficient amounts to cover and repair the breakage;
    e. Guide and position the packer with the repair materials into the site of the damage/breakage;
    f. Introduce pressurized medium into the packer, thereby expanding the packer, such that the repair materials comes into contact with the site of repair;
    g. Either simultaneously or after pressurized medium is introduced into the packer, the heating means are activated, increasing the temperature of the packer to a desired temperature selected between 15 and 105° C.;
    h. Maintaining pressure and temperature in the packer during the specified curing time for the particular repair materials used;
    i. Turning off the heating means, deflating the packer and withdrawing the packer from the site.

20. Method of repairing an underground pipe using a packer according claim 10 comprising the following steps:
    a. Localizing the damaged pipe, the size of the breakage and the diameter of the pipe
    b. Selecting a packer according to claim 10, said packer having a size smaller than the diameter of the pipe when not inflated and a diameter larger than the damaged pipe when inflated;
    c. Connecting the selected packer to a source of pressurized medium—typically air, and a source of electric energy;
    d. Applying repair materials to the outside of the packer in sufficient amounts to cover and repair the breakage;
    e. Guide and position the packer with the repair materials into the site of the damage/breakage;
    f. Introduce pressurized medium into the packer, thereby expanding the packer, such that the repair materials comes into contact with the site of repair;
    g. Either simultaneously or after pressurized medium is introduced into the packer, the heating means are activated, increasing the temperature of the packer to a desired temperature selected between 15 and 105° C.;
    h. Maintaining pressure and temperature in the packer during the specified curing time for the particular repair materials used;
    i. Turning off the heating means, deflating the packer and withdrawing the packer from the site.

* * * * *